United States Patent [19]

Hahn

[11] 3,939,236

[45] Feb. 17, 1976

[54] METHOD FOR BLOW MOLDING FOAMED WALLED PLASTIC OPEN MOUTHED CONTAINERS

[75] Inventor: Granville J. Hahn, Dallas, Tex.

[73] Assignee: Cosden Oil & Chemical Company, Big Spring, Tex.

[22] Filed: Jan. 24, 1973

[21] Appl. No.: 326,568

Related U.S. Application Data

[63] Continuation-in-part of Ser. No. 81,488, Oct. 16, 1970, abandoned.

[52] U.S. Cl. ................... 264/53; 264/54; 264/98; 264/150; 264/151; 264/159; 264/163; 264/321; 264/DIG. 1; 425/296; 425/DIG. 214; 425/817 R

[51] Int. Cl.² ................B29C 17/07; B29C 17/14; B29D 27/00

[58] Field of Search ............. 264/47, 53, 54, 89, 94, 264/96, 98, 99, 150, 151, 159, 163, 321, 46.1, DIG. 1; 425/296, 302 B, 817, DIG. 212, DIG. 214

[56] References Cited
   UNITED STATES PATENTS

| | | | |
|---|---|---|---|
| 3,225,127 | 12/1965 | Scott, Jr. | 264/98 X |
| 3,292,252 | 12/1966 | Reading | 264/98 X |
| 3,381,076 | 4/1968 | Govatsos | 264/163 X |
| 3,432,586 | 3/1969 | Stenger | 264/159 X |
| 3,482,006 | 12/1969 | Carlson, Jr. | 264/54 |
| 3,545,040 | 12/1970 | Mehnert | 425/150 |

*Primary Examiner*—Jan H. Silbaugh

[57] ABSTRACT

The method for blow molding foam walled plastic using a quadrisectional mold. A parison of foamed plastic may be blow molded to assume the contour of the closed mold, after which the molded shape is severed into two portions and ejected. Desirably, cellular plastic is blow molded to form hot drink cups.

4 Claims, 8 Drawing Figures

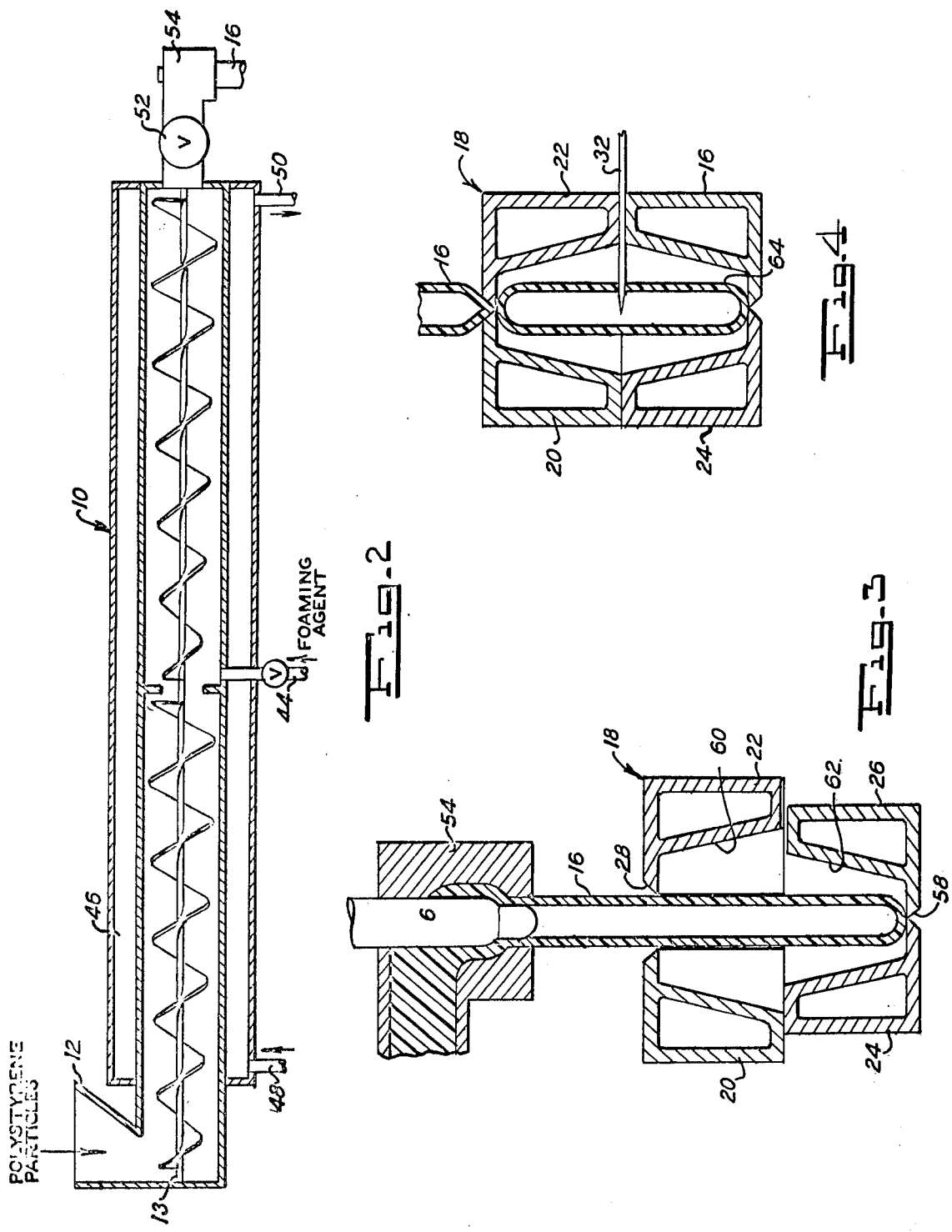

METHOD FOR BLOW MOLDING FOAMED WALLED PLASTIC OPEN MOUTHED CONTAINERS

This invention is a Continuation-in-Part of copending application Ser. No. 81,488 filed Oct. 16, 1970, now abandoned.

This invention relates to a method for blow molding of foamed plastic containers. More particularly, the present invention provides an effective method for preparing a molded foam container article such as hot drink cups by blow molding a cellular plastic in a section mold to form a foam walled body shaped as a pair of cups and severing the shaped articles into two useful open top portions.

Various methods have been proposed for preparing hollow plastic articles. One of the most common methods includes placing a parison of heat-softened plastic within a mold and then blow molding the plastic such that it conforms and assumes the contour of the mold cavity. Typically, these methods apply to formation of unitary configuration articles which are blow molded using noncellular plastic materials. It has now been found that by practice of the present invention, an apparatus and method are provided which permit formation of severable foam walled articles using blow molding techniques. The present invention thus provides simple duplication of articles with a high degree of accuracy which may be repeated with maximum efficiency.

Broadly stated, the method of the present invention employs a sectional mold preferably having an upper left mold quadrant, an upper right mold quadrant, a lower left mold quadrant and a lower right mold quadrant all forming a mold cavity when joined. The upper mold quadrants are movable relative to each other as are the lower mold quadrants. Also, the upper mold quadrants are movable relative to the lower mold quadrants to permit a severing means to move transverse a molded article disposed therebetween.

The method of the present invention generally provides for extruding cellular plastic through an annular orifice to form a tubular configuration. The tubular configuration is first received by a quadrisectional mold and the lower quadrants thereof are closed. Desirably, the bottom joining edges of the lower quadrants pinch and sever the lower edge of the foamed plastic tube. Next, the upper quadrants are joined and positioned over the lower quadrants to form a cavity about the foam walled plastic or parison tube. Desirably, the upper joining edges of the upper quadrants also pinch and sever the plastic tube at the top of the length to be blow molded. The cavity confined plastic tube or parison is blow molded to assume the contour of the cavity of the closed mold. Next, the upper and lower quadrants of the mold are separated and the article within the mold is severed into two portions. Thereafter, the bottom quadrants of the mold as well as the upper mold quadrants, if desired, are opened to permit two molded articles to eject from the cavity.

The present method is superior in that the blow molded foam formed into a pair of containers, such as cups, are severed apart with a single cut by a thin cutting instrument applied to the molded product at their joint centers, the point of mouth to mouth joinder of the cups; the single applied cut leaving no scrap material and resulting by that single cut, in production of two finished cups. Particularly it is preferred to sever the cups by using a thin hot wire which not only affects the thin cut to separate the molding into two cups, but warms and melts the severed cup edges and fire polishes the cut edges, whereby the cups are actually finished and are ready for use by the single hot wire cut. Moreover, it is preferred to apply the cut, usually at the exact center line of joinder of the cups, in a manner to intercept and efface the needle hole that may remain from insertion of the blowing needle into the median line of the two cups formed in the blow molding, whereby the hot wire removes any remnant, irregularity or residue of the needle hole in the single hot melting or fire polishing cut.

The apparatus described herein is readily incorporated into an automatic arrangement for manufacture of plastic articles such as foam walled drinking cups, and requires a minimum of supervision. Additional aspects and advantages of the invention will become apparent from the following detailed description of a preferred embodiment considered together with the accompanying drawings in which:

FIG. 1 diagrammatically illustrates in perspective preparation of articles using the method and apparatus of the present invention;

FIG. 2 is a side elevational view taken in half-section of an extrusion unit;

FIG. 3 diagrammatically illustrates introduction of a parison into a quadrisectional mold;

FIG. 4 diagrammatically illustrates in half-section the positioning of a parison within the quadrisectional mold prior to blow molding;

Although the present invention will be described hereinafter with particular reference to foam walled polystyrene products, it is recognized that other cellular plastics may be used including without limitations plastics such as polyethylene, polybiochloride, polyurethane elastomers, cellulose acetate, styrene acrylonitrile, ethylene propylene copolymers, and the like. High impact polystyrene containing about 5% to about 25% polybutadiene is especially useful for preparing hot drink cups by the practice hereof.

Practice of the present invention becomes more apparent with reference to the figures wherein similar elements are referred to by similar numerals throughout these several views.

Figure 1:
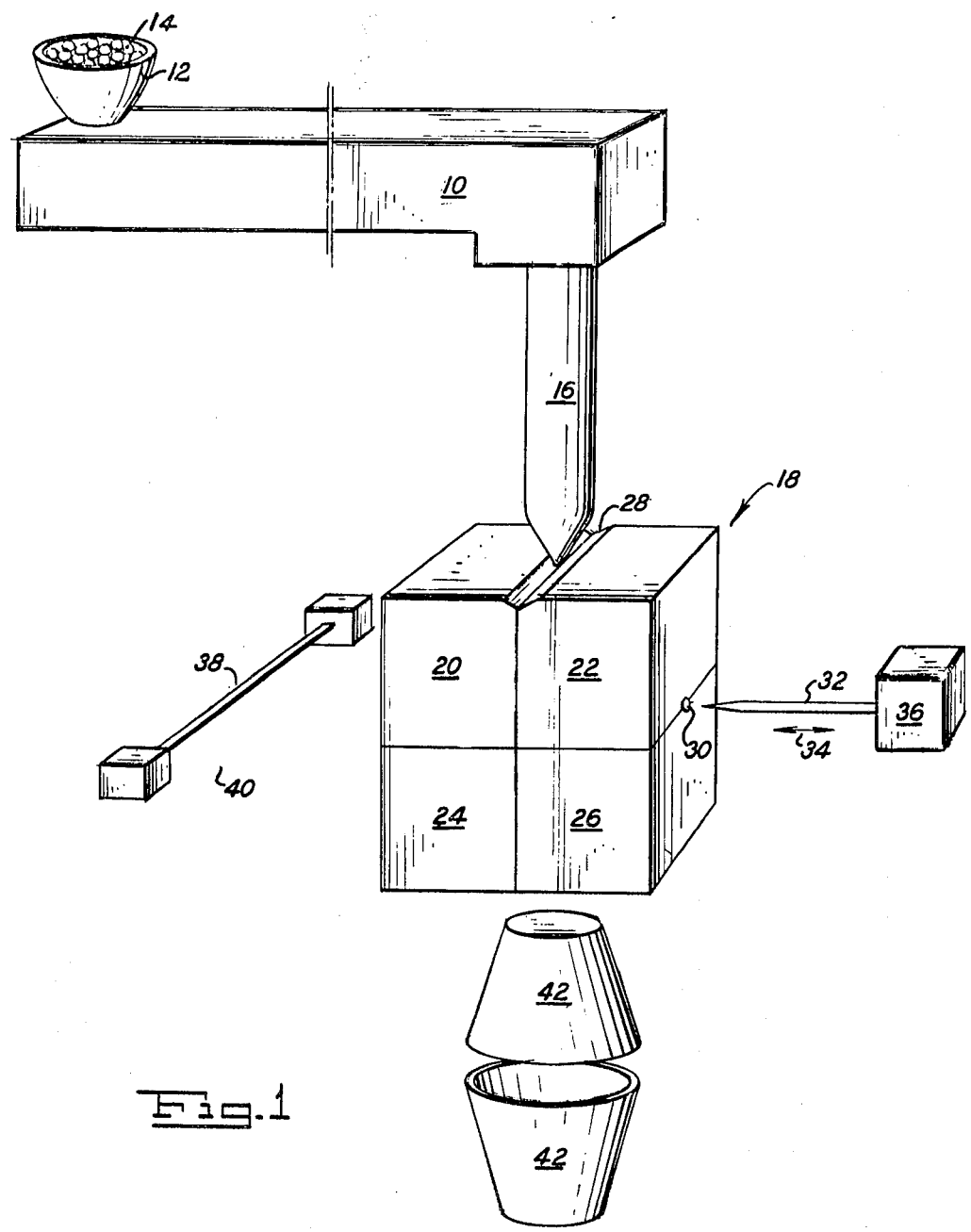

Referring to FIG. 1, wherein the method and apparatus of the present invention is diagrammatically illustrated, extrusion unit 10 includes a hopper or funnel shaped plastic supply 12 wherein particles of polystyrene 14 may be introduced. The particles are extruded from extrusion unit 10 as a tubular configuration 16 for introduction within quadrisectional mold 18. The quadrisectional mold includes an upper left quadrant 20, an upper right quadrant 22, a lower left quadrant 24, and a lower right quadrant 26. Edges may be provided between the upper quadrants 20 and 22 appearing as pinching surface 28 for severing and pinching or constricting the tubular configuration 16. Provided between quadrants 22 and 26 there appears needle entrance 30 into which a hollow needle 32 may be introduced as indicated by arrow 34 for blow molding using a conventional system generally illustrated as element 36.

After an article is blow molded within quadrisectional mold 18 using an expanding fluid such as air or nitrogen through hollow needle 32, the article may be severed into two portions using a severing means such as hot wire 38 which travels horizontally between quadrants 20 – 22 and quadrants 24 – 26 in the direction of arrow 40. After the blow molded article is severed, it is ejected from quadrisectional mold 18 and appears as, for example, hot drink cups 42. The hot wire 38 is preferably thin and hot enough to melt the plastic wall as it severs the product into two blow molded containers, leaving a smooth 'fire-polished' rim at the top of the severed cups resulting in a smooth melted top cup rim on both cups formed as the hot wire passes through the plastic wall in a single cut, severing the molded product into halves. In this manner of cutting no scrap material results and the single cut thereby produces two finished cups without scrap material, each cup having 'fire-polished' rims. It is desirable, of course, to apply the hollow needle exactly in the median line between the two cups and to apply the hot wire to sever the molding into the two cups with the wire passing through the wall at the exact position of the needle hole, thereby effacing any slight imperfection that might appear in the rim of the cup, as formed by the insertion of the needle during the blowing.

Referring to FIG. 2, extrusion unit 10 is illustrated in greater detail with particles of polystyrene introduced within funnel 12. Extruder 10 may be fed with conventional expandable polystyrene beads which contain the proper amount of incorporated foaming agent or alternatively such foaming agent may be applied to the polystyrene within the extrusion unit through inlet 44. Volatile foaming agents useful herein typically have boiling points below about 100°C at atmospheric pressure. Among liquid foaming agents, aliphatic hydrocarbons containing isomers of $C_5$ to $C_7$ and halogenated hydrocarbons are especially useful. Low boiling alcohols, ethers, ketones and aromatic hydrocarbons may also be used. Aliphatic hydrocarbons are useful in production of cellular polystyrene and may be prepared by dissolving the liquid foaming agent in the polymer under moderate pressures and subsequently extruding the gas-saturated melt with simultaneous cooling.

It will thus be apparent that foaming agents for preparing cellular plastics may vary in a wide range of formulation and types, depending on the plastic, temperature, product uses and the like. The foaming agent may be employed with or without nucleating agents, as desired. Specific examples of useful foaming agents include pentane, neo-pentane, hexane, iso-hexane, heptane, benzene, methylene chloride, dichlorotetrafluoroethane and related chloro-fluoroethanes, simple organic or inorganic salts of carbonates, bicarbonates, oxylates, sodium borohydride, azo bis-formamide, and related aliphatic azo compounds.

Extrusion unit 10 includes extruder 12 which advances polystyrene pellets at relative low temperatures of about 250°F to 260°F along a long inner barrel of the extruder. A screw with great depth at the feed and decreasing toward the metering end is especially desirable. A low compression ratio of about 2 : 1 to about 3 : 1 is generally sufficient. This ratio improves quality substantially and primarily in that rupture of cells is limited.

Extruder 10 may include heating chamber 46 into which fluid may be introduced such as through inlet 48 and removed through outlet 50, as desired. At the exit end of extruder 10, metering value 52 may be included as desired to regulate the exit flow of the cellular polystyrene forming a tubular configuration 16.

FIG. 3 illustrates in greater detail extrusion of the tubular configuration of polystyrene 16 from extrusion outlet 54 which includes shaping rod 56 to provide the necessary annular outlet for extrusion of the tubular configuration.

Quadrisectional mold 18 having bottom quadrants 24 and 26 joining by edge 58 which provides a means for severing and pinching the tubular configuration 16 to provide a closed lower end thereof when introduced into the mold. After the tubular configuration 16 appearing as a parison within the mold is in position, upper quadrants 20 and 22 are closed with edge 28 severing and pinching an upper portion of the parison. When the quadrants of the mold are closed, the cavity thereby formed is illustrated as two joined hot drink cups formed by surfaces 60 by the upper quadrants and surfaces 62 by the lower quadrants of the mold.

To effect blow molding of parison 64 within quadrisectional mold 18, hollow needle 32 is introduced into the parison. With the parison closed at both ends, air may be introduced through the needle which pierces the tube in the central portion of the molded piece. An alternate means for introducing air into the parison is by use of a gasliberating pellet which may be dropped into the parison as the mold closes. The pellet may then release a gas which blows the parison into the shape of the mold cavity such as is generally described in U.S. Pat. No. 2,975,472.

Figure 5:
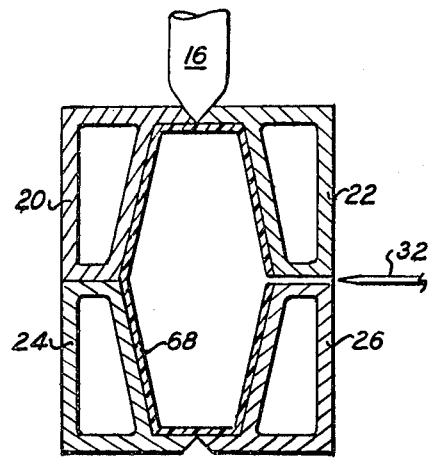
FIG. 5 illustrates diagrammatically in half-section blow molding of an article within the quadrisectional mold.

After the parison has been blow molded it assumes the contour of the cavity of the mold as illustrated in FIG. 5. The mold may include if desired chamber 66 through which a heating fluid such as steam or the like may be introduced to maintain proper temperature conditions during molding. The amount of heat which is supplied will depend to a considerable extent upon the rapidity of molding operation, and the size and shape of the articles being molded. If desired, additional heating means may be included to keep the parison in soft condition while the mold is being operated.

Figure 6:
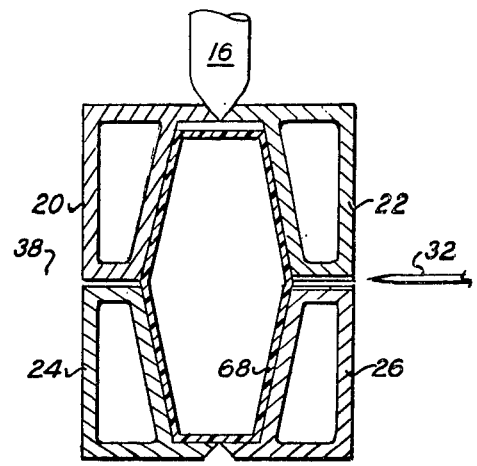
FIG. 6 illustrates diagrammatically in half-section severing of an article blow molded within the quadrisectional mold.
Figure 7:
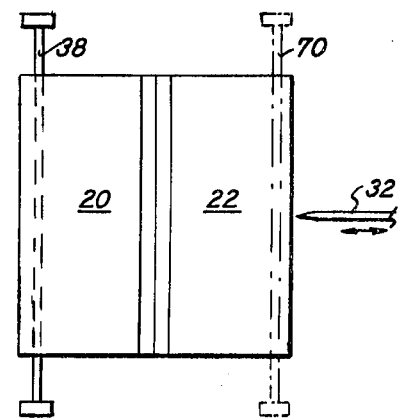
FIG. 7 illustrates as a top elevational view severing of an article within the quadrisectional mold.

After the article has been blow molded, and as illustrated in FIG. 6, the upper quadrants 20 and 22 are separated relative to lower quadrants 24 and 26 to permit a small passageway for introduction of article severing means 38 desirably appearing as a hot wire. Because of the compressable nature of the foam, severing must be done with either very sharp tools or by the hot wire process. The severing means is passed between the parted quadrants and thereby severs molded article 68 appearing within the cavity. Severing of the article is illustrated further in FIG. 7 with severing means 38 moving to phantom position 70.

Figure 8:
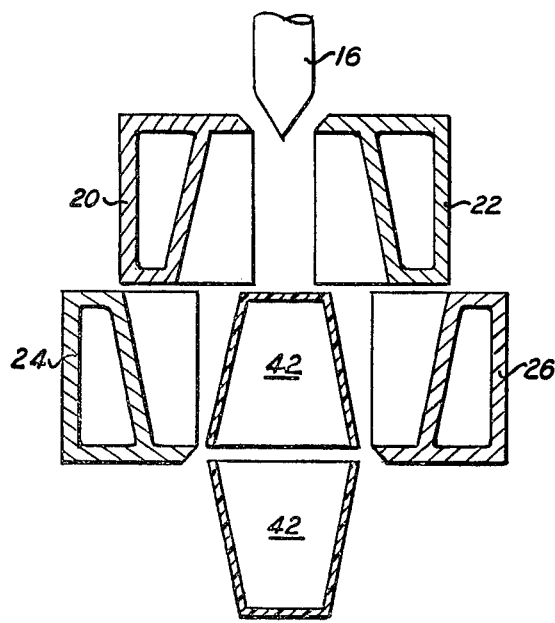
FIG. 8 illustrates diagrammatically in half-section ejection of blow molded articles from the quadrisectional mold.

After the article has been severed, and specifically referring to FIG. 8, the lower quadrants 24 and 26 of the mold are separated thereby permitting ejection of the severed article from the mold cavity. The article now appears as hot drink cups 42. Upon introduction of parison 16, the process is repeated in preparation of additional articles as described.

The following example illustrates the practice of this invention:

EXAMPLE I

Particles of polystyrene homopolymer are fed to an extrusion device as shown in FIG. 1. The device consists of a screw enclosed by a heated barrel and driven by a gear reducer. The screw consists of a feed section and a gas injection section. The polymer particles move along said screw and are gradually converted to a homogeneous melt phase. This melt is forced over a restricted area of the screw and into the gas injection zone. At this point nitrogen is injected and the screw mixes said nitrogen with the polymer to form a homogeneous mixture. This mixture exits the extrusion device through a back pressure valve and an annular orifice approximately one inch in diameter. The extruded polystyrene nitrogen mixture foams as the pressure decreases through the back pressure valve. The foam emerges from the orifice in the form of a pipe or tube. Another device containing a two-part mold and means for opening and closing said mold is positioned near the orifice such that with the two parts of the mold held apart, the tube of foam is extruded in the open air between the parts. When the foam tube has extruded as far as the lower end of the two-part mold, the mold is made to close and cut off both ends of the foam tube. The two-part mold is rotated away from the extrusion device and compressed air is immediately injected into the interior of the foam tube causing the tube of foam to conform to the mold shape. The mold shape approximates a short cylinder with the center of larger diameter than the two ends. The mold, cooled with water, rapidly cools the polymer below 150°F such that the foam hardens and retains the mold shape. The two-part mold is caused to open and the cylinder shaped foam falls out. Both ends are sealed with foam. A hot wire device is used to cut the cylinder perpendicular to its radial axis such that two pieces of foam are obtained. The two parts are cup shaped with an open top end diameter slightly larger than the sealed bottom end diameter.

The various mechanisms for the mechanical operation of the present system have not been described in detail herein since such mechanisms are well-known in the art. The various parts may be supported in any desired manner relative to one another and accordingly, although a preferred embodiment of the invention has been illustrated herein, it is to be understood that various changes and modifications may be made in the construction and arrangement of elements without departing from the spirit and scope of the invention as defined.

What is claimed is:

1. A method for blow molding foamed walled plastic open-mouthed containers which comprises extruding foamed plastic through an annular orifice to form a foamed parison of tubular configuration, having foamed walls pinching a lower section of the tubular configuration within a lower portion of a sectional mold, pinching an upper portion of the tubular configuration within an upper portion of a sectional mold, introducing a gas through a hollow needle inserted at a point through a center portion of said mold and parison therein and blowing the tubular configuration with a gas introduced through said needle at said point to form a hollow foam-walled body assuming the contour of the closed mold and severing the molded hollow article in a single thin cut with a hot severing means passed through the center thereof, including the aperture formed in blowing, into two foamed wall container portions, said severing means melting said plastic as it passes thereby severing said container into clean smooth cut halves and substantially removing the aperture formed by said needle without substantial removal or production of plastic inter-connecting substances as scrap material.

2. A method for blow molding foamed plastic as defined in claim 1 wherein said mold has conically flared portions at the center, and tapering to smaller diameter portions at each end, and the tubular configuration is blown with a gas introduced through said point to form a hollow foam-walled body assuming the contour of the closed mold, separating the upper and lower mold quadrants and severing the molded article in a single planar cut into two cup-like foamed container portions.

3. The method of claim 1 wherein the foamed plastic is a polystyrene containing composition.

4. The method of molding foam-walled cups comprising heating and softening thermoplastic particles to extrudable fluidity, introducing a foaming agent under pressure into the softened mass and extruding a parison of said softened plastic through an orifice to form a parison in the shape of a tubular body having foamed walls, periodically introducing lengths of said tubular body into an open multi-sectional mold, said mold severing and enclosing a molding length of said extruded tube corresponding to a pair of cups between opposite mold ends upon closure, said mold having its inner mold surfaces shaped as a pair of cups assembled mouth to mouth, inserting a hollow needle connected to a blowing gas supply through an aperture passing radially through the center of the mold wall a sufficient distance to penetrate the wall of said tube, introducing a blowing gas into said tube through said needle to expand its walls to a molded body corresponding to the shape of said mold as a pair of hollow cups in mouth to mouth assembly in said mold, separating said molds and severing the mouth portions of said molded cup bodies in a single hot wire cut from each other into a pair of cups, said hot wire severing means being thin and adapted to pass as a single cut through the walls of the plastic molding, melting said plastic as it passes to leave a simulated 'fire polished' container lip at the severed wall portion, said cut being passed centrally of said molding to intercept and obliterate by melting the needle hole remaining in the cup wall following the formation of the molding.

* * * * *